United States Patent [19]

Perry

[11] 4,440,554
[45] Apr. 3, 1984

[54] GAS SCRUBBING DEVICE

[75] Inventor: Geoffrey A. Perry, Livonia, Mich.

[73] Assignee: Gallagher-Kaiser Corp., Detroit, Mich.

[21] Appl. No.: 430,327

[22] Filed: Sep. 30, 1982

[51] Int. Cl.³ ............................................. B01D 47/00
[52] U.S. Cl. ................................... 55/241; 55/257 R; 55/435; 55/226; 261/DIG. 54; 261/112; 98/115 SB
[58] Field of Search .................. 55/226, 220, 240, 241, 55/257 R, 435; 98/115 SB; 261/DIG. 54, 112

[56] References Cited

U.S. PATENT DOCUMENTS

| | | |
|---|---|---|
| 3,057,700 | 10/1962 | Gross .......................... 261/DIG. 54 |
| 3,168,031 | 2/1965 | Wilhelmcon et al. .......... 98/115 SB |
| 3,706,538 | 12/1972 | Chew .......................... 261/DIG. 54 |
| 3,884,654 | 5/1975 | de Crevoisier et al. . |
| 4,012,469 | 3/1977 | Accortt . |
| 4,023,942 | 5/1977 | Brady et al. . |
| 4,045,524 | 8/1977 | Bornert ............................... 261/112 |
| 4,210,428 | 7/1980 | Schneider et al. . |
| 4,220,078 | 9/1980 | Walker et al. .......................... 55/240 |
| 4,257,784 | 3/1981 | Gebhard et al. . |
| 4,260,563 | 4/1981 | Brulhet . |
| 4,339,742 | 8/1983 | Dobias ......................... 261/DIG. 54 |
| 4,345,921 | 8/1982 | Gustavsson et al. .................. 55/241 |

Primary Examiner—Bernard Nozick
Attorney, Agent, or Firm—Harness, Dickey & Pierce

[57] ABSTRACT

An improved scrubbing device suitable for use in modular paint spray booths for extracting particulate matter entrained in a gas stream. The device includes an angularly inclined flood sheet adapted to be flooded with a continuous sheet of liquid and formed with a trough having a plurality of removable venturis disposed in spaced relationship through which the gas stream passes in a manner to effect atomization of the liquid flowing therethrough for scrubbing and extracting the particulate matter in the gas stream. Each venturi can be readily removed for periodic cleaning and service as well as replacement by alternative venturi configurations to modify the scrubbing characteristics thereof consistent with changes in the type and loading of particulate matter in the gas stream thereby achieving continuous optimum operating efficiency.

16 Claims, 7 Drawing Figures

GAS SCRUBBING DEVICE

BACKGROUND OF THE INVENTION

The present invention broadly relates to an improved scrubbing apparatus for extracting contaminating particulate matter entrained in a gas stream employing a liquid washing medium. The principles of the present invention are particularly applicable, but not necessarily restricted to the removal of entrained paint particles from the exhaust air stream from paint spray booths to provide an environmentally acceptable effluent while simultaneously recovering the paint overspray for processing in a paint reclamation system.

A variety of scrubbing devices have heretofore been used or proposed for use in association with paint spray chambers or booths. While such devices have provided satisfactory operation in the past, the imposition of more stringent environmental specifications on the maximum permissible levels of particulate matter in the exhaust effluent has necessitated further development of improved designs to increase the effectiveness of such devices in capturing and extracting large proportions of the entrained particulate matter. A continuing problem associated with scrubbing devices of the types heretofore known has been the lack of flexibility and versatility in adapting such devices to changes in the paint formulations and spray loading characteristics as occasioned by the development and commercial use of improved coating materials and the use of robot paint application systems along selected sections of a spray booth tunnel.

In the painting of automobile bodies, for example, it is conventional practice to sequentially apply one or more prime coatings followed by one or more finish or top coatings to the automobile body employing a series of individual spray booth tunnels separated by intervening bake ovens for curing the coating. The different formulations of such individual paint systems produce different overspray characteristics and capture tendencies of the paint particles whereby the scrubbing system for each such spray booth tunnel must be tailored to achieve optimum extraction of the contaminated particulate matter. Changes in a specific coating sequence and/or modifications in one or more of the individual paint systems employed necessitates a readjustment of the scrubbing device to restore it to optimum operation under the specific conditions encountered. While some scrubbing devices of the types heretofore known have suggested the use of movable baffle components to vary the scrubbing characteristics to accommodate variations in the paint spray parameters encountered, such devices have been less than satisfactory due to the tendency of such movable mechanisms to become encrusted with a layer of the particulate material rendering them inoperative and necessitating frequent time consuming and costly cleaning operations to restore them to satisfactory operating condition.

There has, accordingly, been a long felt heretofore unfilled need for an improved scrubbing device incorporating a low energy, high efficiency scrubbing mechanism which is readily replaceable to adapt the device to any particular scrubbing condition thereby attaining optimum efficiency and versatility. Additionally, the replaceable nature of the scrubbing mechanism facilitates periodic cleaning and service of the unit minimizing down time and labor associated with such periodic servicing. The scrubbing device of the present invention is also readily adaptable to a modular construction enabling a combination of the desired number of modules to provide a spray chamber tunnel of the desired length consistent with the spray operation to be performed providing for still further versatility and economy in the manufacture, installation and use of the device.

SUMMARY OF THE INVENTION

The benefits and advantages of the present invention are achieved by an improved gas scrubbing device which includes a first chamber, such as a paint spray chamber through which a gas stream passes and becomes contaminated with entrained particulate matter. A second chamber is provided which is separated from the first chamber by an angularly inclined flood sheet which is formed with a trough along the lowermost section thereof in which a plurality of frames are mounted defining communicating openings between the two chambers. A venturi is removably disposed on each frame comprising a pair of downwardly and inwardly inclined side walls and end walls terminating along their lower edges with an inwardly extending lip defining a venturi throat. The upper edge of each venturi is positioned above the base of the sump and supply means are provided for discharging a continuous sheet liquid such as water over the flood sheet for flow toward and into the sump and eventual overflow in the form of a continuous curtainous stream into each venturi. Suitable blower means are provided for providing a pressure differential between the first and second chambers to induce the flow of the gas or air stream from the first chamber through the venturi in a manner so as to effect an atomization of the liquid at the lip of the venturi throat assuring intimate washing contact and entrapment of the particulate matter in the gas stream by the liquid washing medium.

Each venturi is removably mounted on the frame and is preferably sealed such as by the use of a plastic mastic sealing material to avoid bypass of gas between the venturi and the frame. The scrubbing action of the sections can be varied as may be desired or required by inserting alternative venturis having a lip size to provide the desired cross-sectional opening of the venturi throat to achieve the desired magnitude of atomization of the washing media. In accordance with a preferred embodiment of the present invention, a suitable liner is provided which is disposed in form-fitting relationship over the venturi which can be removed and discarded and replaced with a fresh liner to facilitate cleaning of the system and a maintenance of optimum operating performance. Such liners may be of any one of a variety of materials of which fluorocarbon polymers such as polytetrafluoroethylene comprises a preferred material.

The second chamber into which the atomized liquid and scrubbed gas stream is discharged is preferably provided with a second trough disposed in intercepting relationship relative to the gas stream effecting a further disengagement of the moisture therein and a washing of the underside of the flood sheet to maintain the device in a clean operating condition. One or a plurality of baffles are preferably incorporated in the second chamber to provide a serpentine gas flow pattern facilitating further disengagement of moisture particles from the gas stream prior to discharge to an exhaust system. The second chamber is also formed with an angularly inclined drain sheet over which the liquid flows from the second sump into a suitable sluiceway from which it is drained into a sludge tank and the recovered particulate matter can be processed, if desired, for reuse.

Additional benefits and advantages of the present invention will become apparent upon a reading of the description of the preferred embodiments taken in conjunction with the accompanying drawings.

BRIEF DESCRIPTION OF THE DRAWINGS

FIG. 6 is a schematic transverse sectional view of the atomizing action occurring in the venturi throat during operation of the device.

DESCRIPTION OF THE PREFERRED EMBODIMENTS

Figure 1:
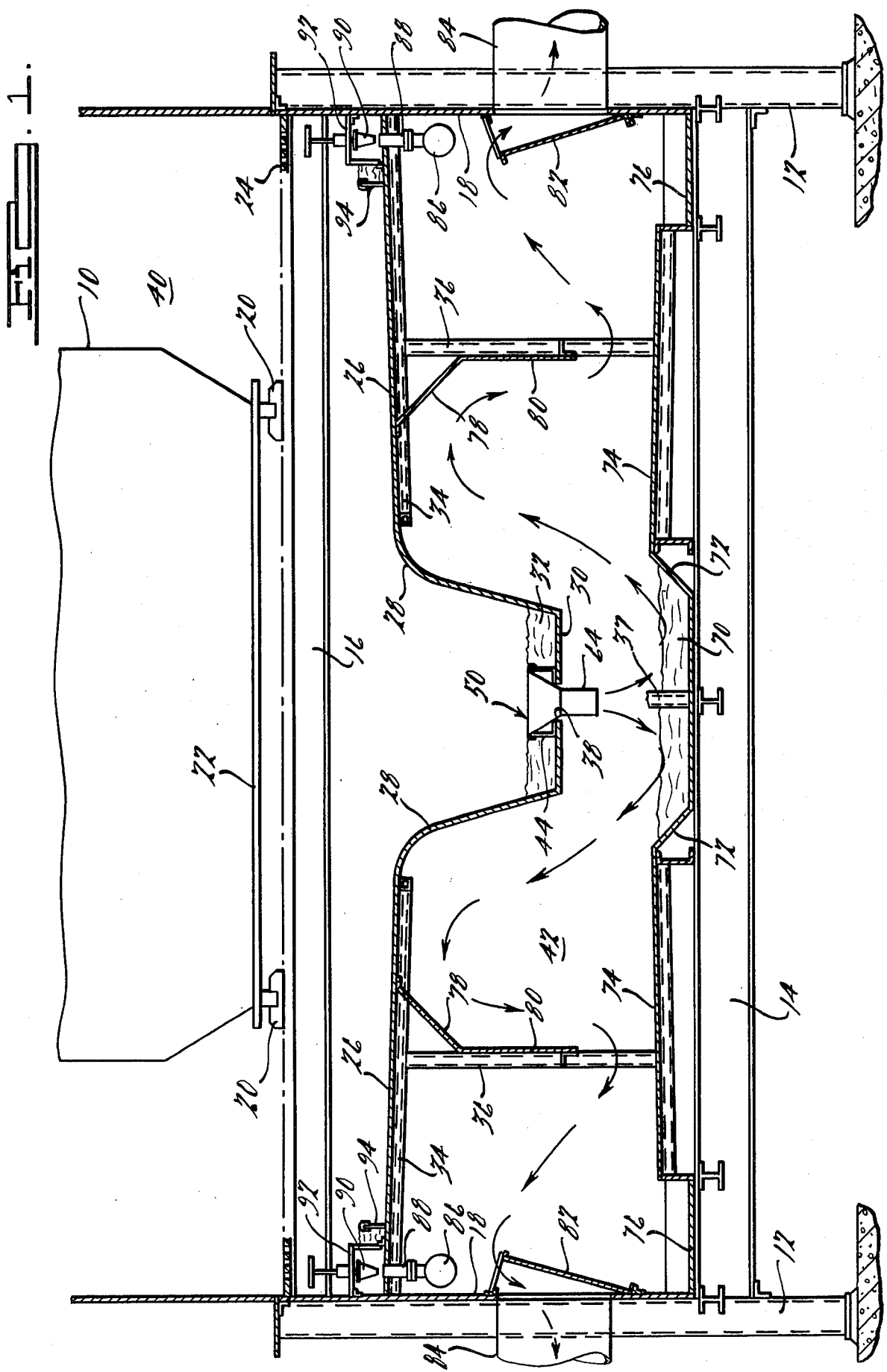
FIG. 1 is a fragmentary transverse sectional view partly in elevation of an improved scrubbing device of the present invention.

Referring now in detail to the drawings and as may be best seen in FIG. 1, an improved scrubbing device is illustrated as adapted to a paint spray tunnel for painting automobile bodies schematically indicated at 10. In the embodiment as illustrated, the spray booth tunnel comprises a framework including a series of vertical supporting legs 12 mounted on a suitable base or platform which are connected at their lower end portions by means of an I-beam member 14 and at an intermediate portion by an I-beam cross member 16. Side panels 18 are secured to the inner surfaces of the supporting legs 12 and extend for the length of the spray booth tunnel. A pair of conveyor rails 20 are suitably supported on the upper surface of the I-beam cross member 16 on which a conveyorized platform 22 is mounted for transporting the automobile body 10 longitudinally along the spray booth tunnel from one spray station to the next. A suitable grating or open mesh floor 24 is supported on the upper surface of the cross member 16 on which the paint spray operators or spray equipment is mounted at a position convenient and accessible to the automobile body.

A flood sheet comprising a pair of symetrical side sections is disposed beneath the cross member 16 comprising a flood sheet section 26 extending inwardly and downwardly and terminating in an arcuate section 28 connected at its lower edge to a base 30 defining a trough generally indicated at 32. The flat flood sheet sections 26 are secured at their outer edges to the side panels 18 and are supported by box beam members 34 and uprights 36. The base 30 of the trough is supported at spaced intervals by means of upright legs 37.

Figure 2:
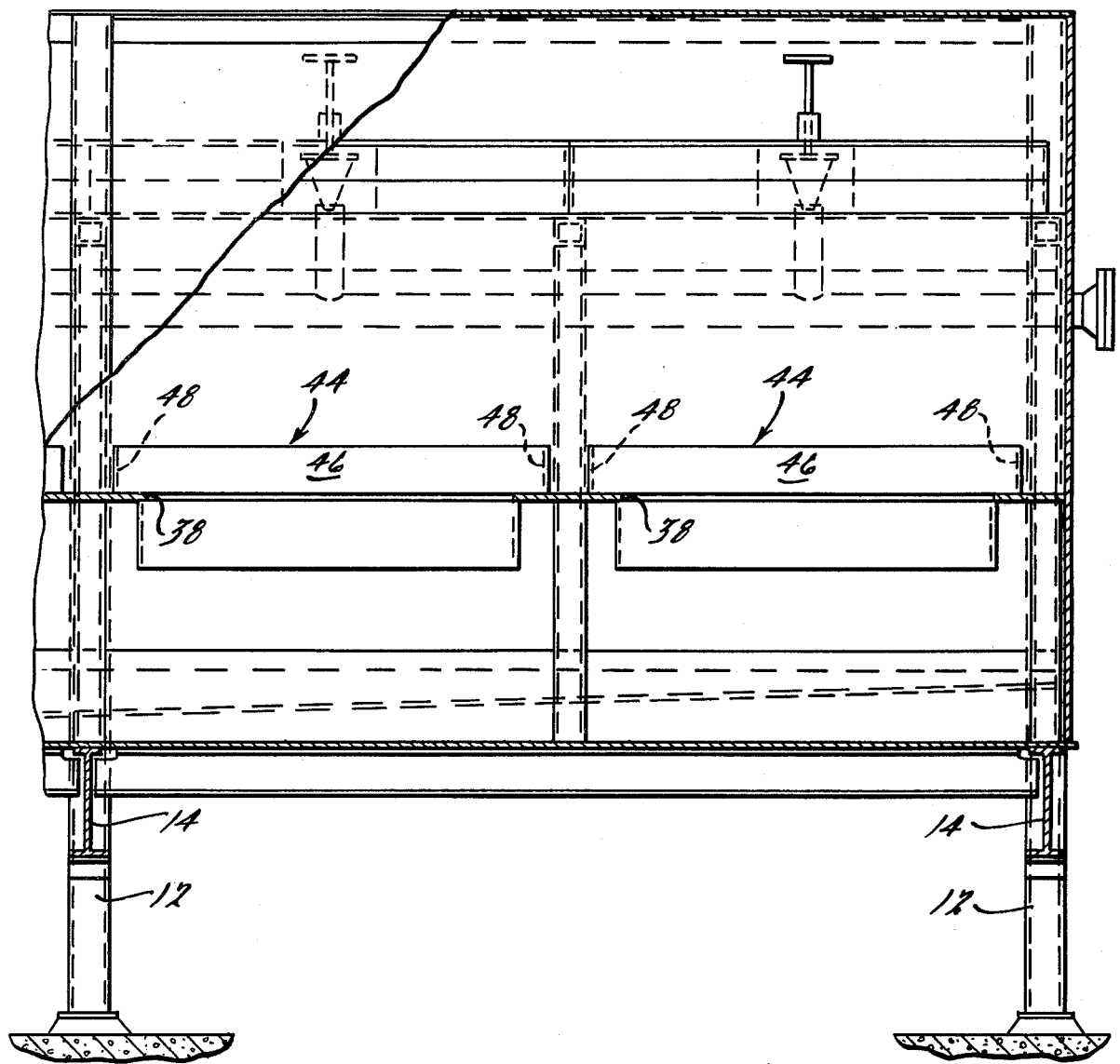
FIG. 2 is a fragmentary side elevational view partly in section of the device shown in FIG. 1.

The central portion of the base 30 as best seen in FIGS. 1 and 2 is provided with a series of longitudinally extending and spaced rectangular openings 38 providing for communication between the upper or first spray chamber and the lower or second moisture eliminating chamber generally indicated at 40 and 42, respectively. A frame 44 of a rectangular elongated configuration comprised of angle iron members secured to the base 30 surrounding each opening 38 defines a pair of upright side legs 46 and end legs 48 for removably supporting a venturi assembly 50 along the upper edges thereof.

Figure 3:
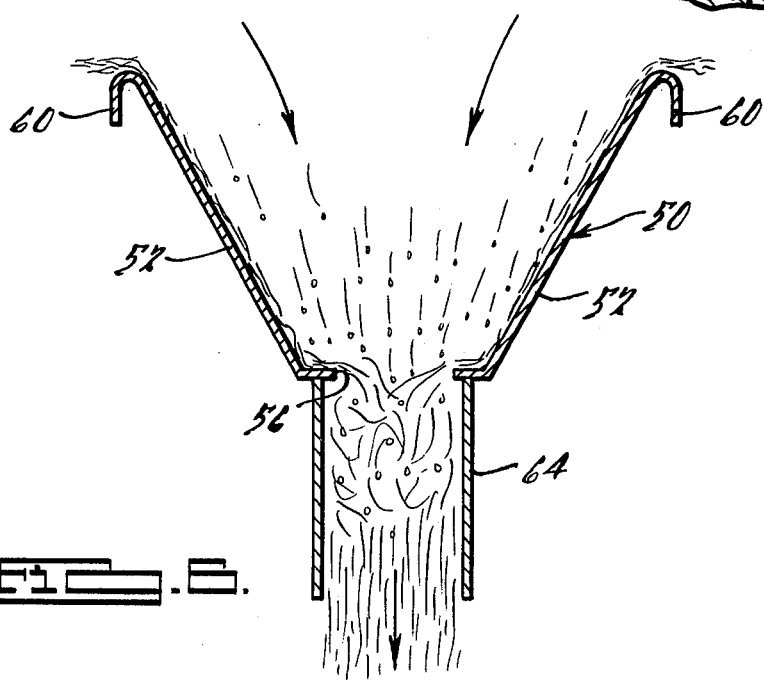
FIG. 3 is an enlarged fragmentary transverse sectional view of a venturi partly in phantom of the type shown in FIG. 1.
Figure 3:
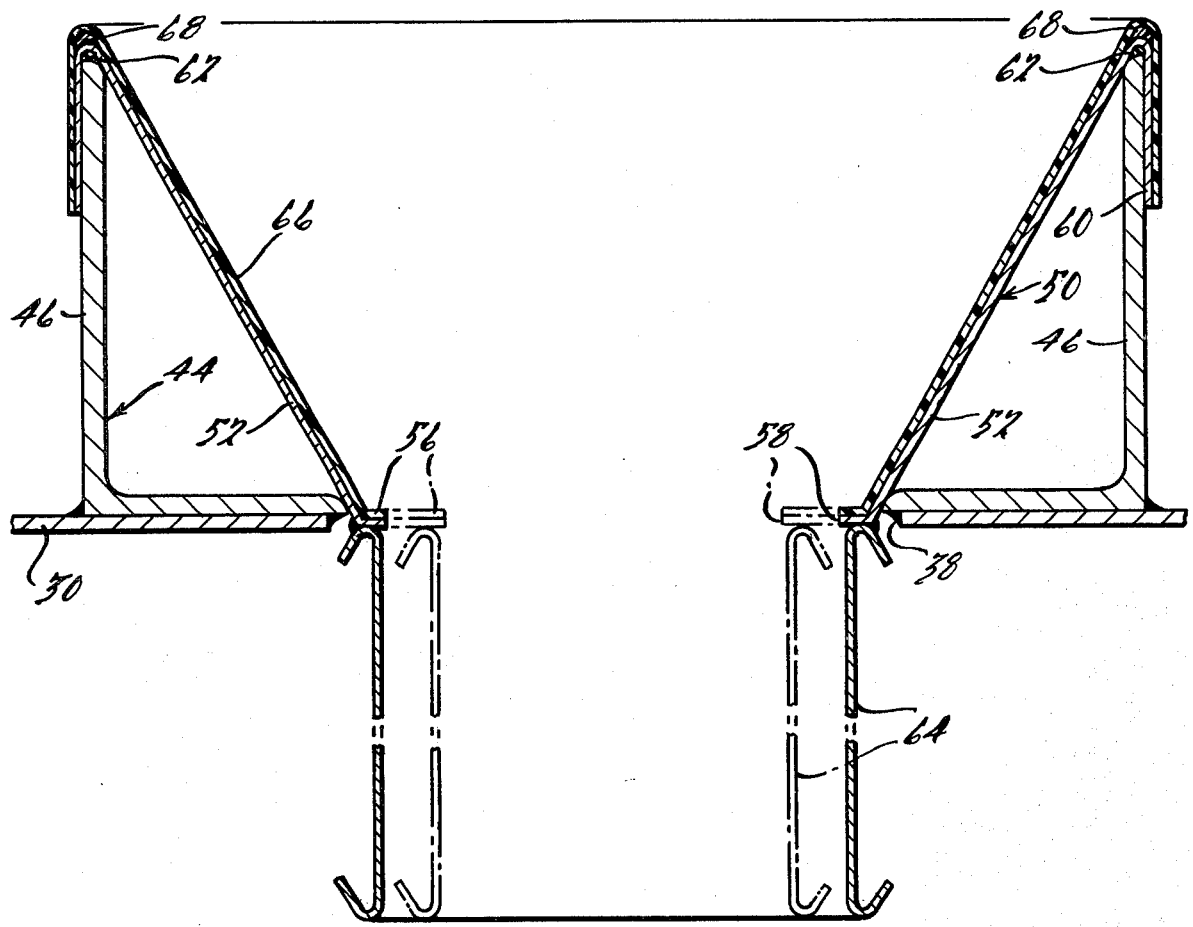
Figure 4:
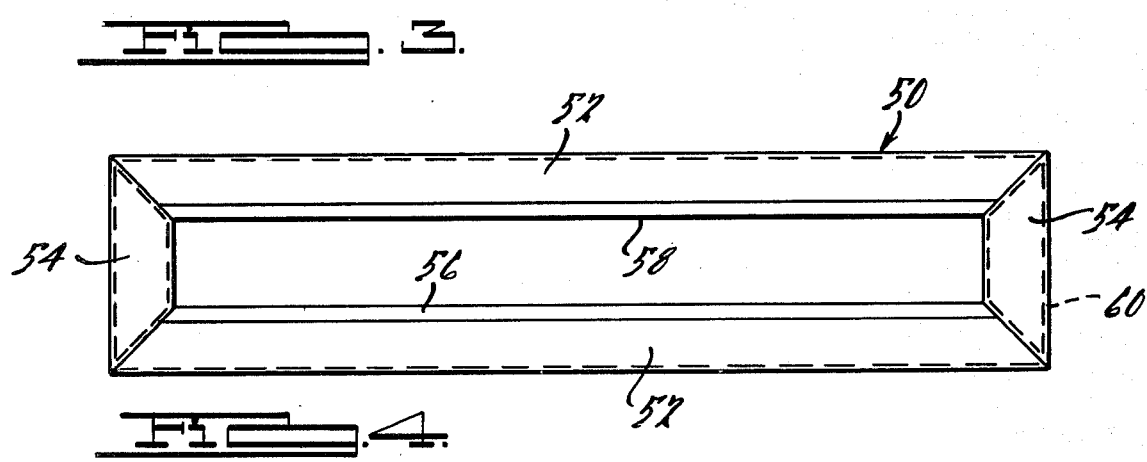
FIG. 4 is a plan view of the venturi shown in FIG. 1.
Figure 5:
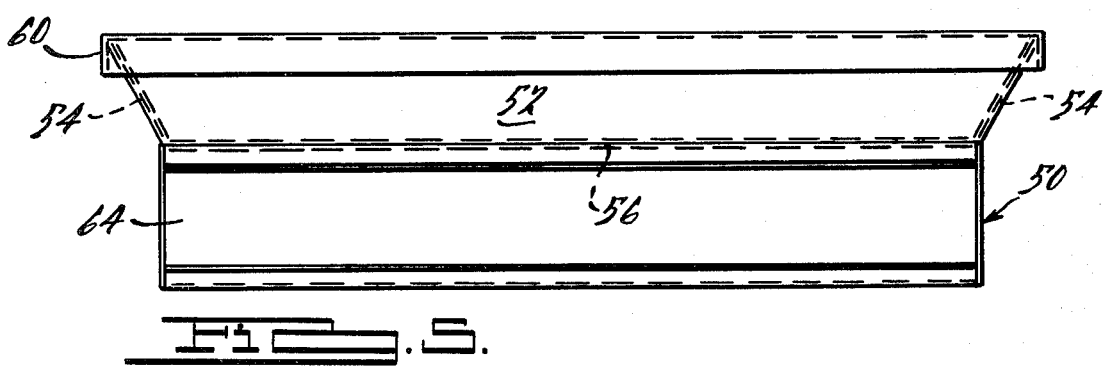
FIG. 5 is a side elevational view of the venturi shown in FIG. 4.

As may be best seen in FIGS. 3 through 5, each venturi assembly 50 is comprised of a venturi defined by a pair of downwardly and inwardly inclined side walls 52 connected to downwardly and inwardly inclined end walls 54 which terminate at the lower edges by an inwardly extending lip 56 which are disposed in opposing relationship and defines a venturi throat 58. The inner edge of the lip 56 is preferably formed with a sharp squared-edge to facilitate fragmentation and atomization of the liquid washing medium in a manner and for the purposes subsequently to be described. The upper edges of the side walls and end walls are formed with a downwardly depending leg 60 for removably overlying and engaging the upper edge portion of the side legs 46 and end legs 48 of the frame 44. The venturi assembly can be removably sealed in a substantially horizontal position on the frame 44 by means of a plastic mastic material interposed along the upper edge of the side legs and end legs 46,48 as generally indicated at 62 in FIG. 3. The use of the sealing material 62 avoids any bypass of the gas stream between the venturi assembly and the mounting frame 44. It also facilitates adjustment of the venturi assembly in order that the upper edge thereof is substantially horizontal to attain a uniform curtainous stream of water flow over the upper edge of the venturi assembly from the adjacent trough 32 during operation as shown in FIG. 1.

In addition to the venturi section itself, the venturi assembly 50 further includes a rectangular duct 64 affixed to the lower surface of the lip 56 as shown in FIGS. 3 and 5 and extends downwardly for a controlled distance to directionally guide the gas and liquid passing through the venturi assembly and to maintain the energy field to assure good particulate capture.

The versatility of the replaceable nature of each venturi assembly is further illustrated in phantom in FIG. 3. As shown in phantom, when changes in the operating characteristics occur in the upper spray chamber such as occasioned by the use of alternative paint formulations having different overspray and capture characteristics as well as changes in the quantity of coating composition discharged, optimum scrubbing and performance of the device of the present invention can be restored consistent with such changes by replacement of the venturi assembly with one of a controlled different throat cross-sectional area to achieve the desired pressure drop and degree of atomization of the liquid wash medium at the venturi throat. The venturi assembly as shown in solid lines in FIG. 3 is identical to the venturi assembly as shown in phantom with the exception that the lip 56 has been extended reducing the cross-section area of the throat 58 with a corresponding reduction in the size of the duct 64 connected thereto. In this manner, major as well as minor adjustments to the scrubbing characteristics of the device can be simply and quickly effected by replacement of one or more venturi assemblies along selected sections of the spray booth tunnel. Further, the venturi device may be removed for cleaning during shutdown, if required.

In accordance with a further embodiment of the present invention as shown in FIG. 3, the upper outer surface of the venturi and the lip 56 thereof can be covered by a suitable form-fitting liner 66 for protecting the under surface. The liner 66 is preferably of a disposable nature enabling removal and replacement thereof at periodic scheduled maintenance intervals to assure cleanliness of the venturi assembly. Liner materials comprised of plastic materials of a composition which resist adhesion of paint droplets are preferred of which fluorocarbon polymers such as polytetrafluoroethylene are particularly preferred. Alternatively, the outer surface of the venturi section can itself be provided with an integral bonded coating of a fluorocarbon polymer to inhibit fouling and to facilitate cleaning of the venturi section at prescribed intervals. When a liner 66 is employed, the liner can suitably be sealed to the venturi section employing a mastic sealer indicated at 68 similar to the mastic 62 interposed between the venturi and the frame.

Referring again to FIG. 1 of the drawings, the lower chamber 42 beneath the flood sheet and venturi assembly is formed with a centrally extending trough 70 having outwardly inclined side walls 72 which are connected at their upper edges to outwardly and downwardly inclined drain sheets 74 which terminate at their outer edges in sluiceways 76 for removing the liquid wash medium. The trough 70 is oriented in the path of the discharge of the gas stream and liquid from the duct 64 of the venturi assembly to effect a lateral and upward discharge of the accumulated mass of liquid in the trough against the underside of the arcuate section 28 of the flood sheet applying a continuous scrubbing and cleaning action thereto to reduce the accumulation of encrusted paint particles thereon. A baffle member including an angularly inclined target wall 78 and vertical wall 80 causes the gas stream and entrained water to pursue a serpentine pattern facilitating elimination of entrained moisture droplets therein. The water draining downwardly off the lower edge of the wall 80 forms a curtainous stream through which the gas stream passes providing a secondary scrubbing action on any residual particulate matter that may still remain. The gas stream upon passing beyond the lower edge of the vertical wall 80 again moves outwardly and upwardly in the direction of flow of the arrows over the upper edge of an adjustable baffle 82 through a port in the side panel 18 and into an exhaust duct 84 through which the scrubbed gas stream can be harmlessly discharged to the atmosphere.

The liquid washing medium such as water, is continuously supplied in the form of an uninterrupted sheet flowing downwardly and inwardly over the upper surfaces of the flood sheet sections 26 and arcuate sections 28 into the trough 32. As shown in FIG. 1, the supply of water can conveniently be achieved by means of a water supply header 86 extending along each side of the lower chamber beneath the flood sheet having a series of risers 88 at spaced intervals therealong through which the water is discharged at a controlled volume by means of an adjustable cone control valve 90. The control valve 90 is supported by an L-shaped bracket 92 connected to the side panel 18 and flood sheet 26. An adjustable weir 94 extends longitudinally along the upper surface of the flood sheet at a position spaced inwardly of the control valve whereby the water discharged from the risers 88 travels inwardly in the form of a continuous sheet over the upper surface of the flood sheet into the trough for ultimate discharge through the venturi assembly.

In accordance with the foregoing arrangement the application of a differential pressure to the lower chamber 42 such as by means of an exhaust fan connected to the exhaust duct 84 causes the gas stream in the upper chamber 40 containing the contaminating particulate matter entrained therein to pass downwardly through the grating 24 through the venturi assemblies. The liquid sheet of wash medium moving inwardly across the upper surface of the flood sheet passes from the sump 32 over the upper edges of each venturi assembly in the form of a curtainous stream and is atomized at the edge of the lips 56 defining the venturi throat causing a turbulent scrubbing action as schematically depicted in FIG. 6. The fragmentation of the liquid sheet of water at the venturi throat effects capture and extraction of the contaminating droplets from the air stream during the continued downward movement through the duct 64 disposed beneath the venturi throat. The liquid wash medium thereafter travels through the lower chamber 42 in a manner as previously described in a serpentine pattern to further eliminate entrained moisture particles in the gas stream.

The lower edge defining the outlet of the duct 64 as shown in FIG. 1 is spaced upwardly from the surface of the liquid in the trough 70 and the axis of the duct 64 is oriented substantially perpendicular to the liquid surface. Accordingly, the air stream is directed into the trough and is deflected by the liquid therein laterally and upwardly without completely penetrating through the liquid layer to the base of the trough leaving a residual intervening layer of liquid thereabove.

Figure 7:
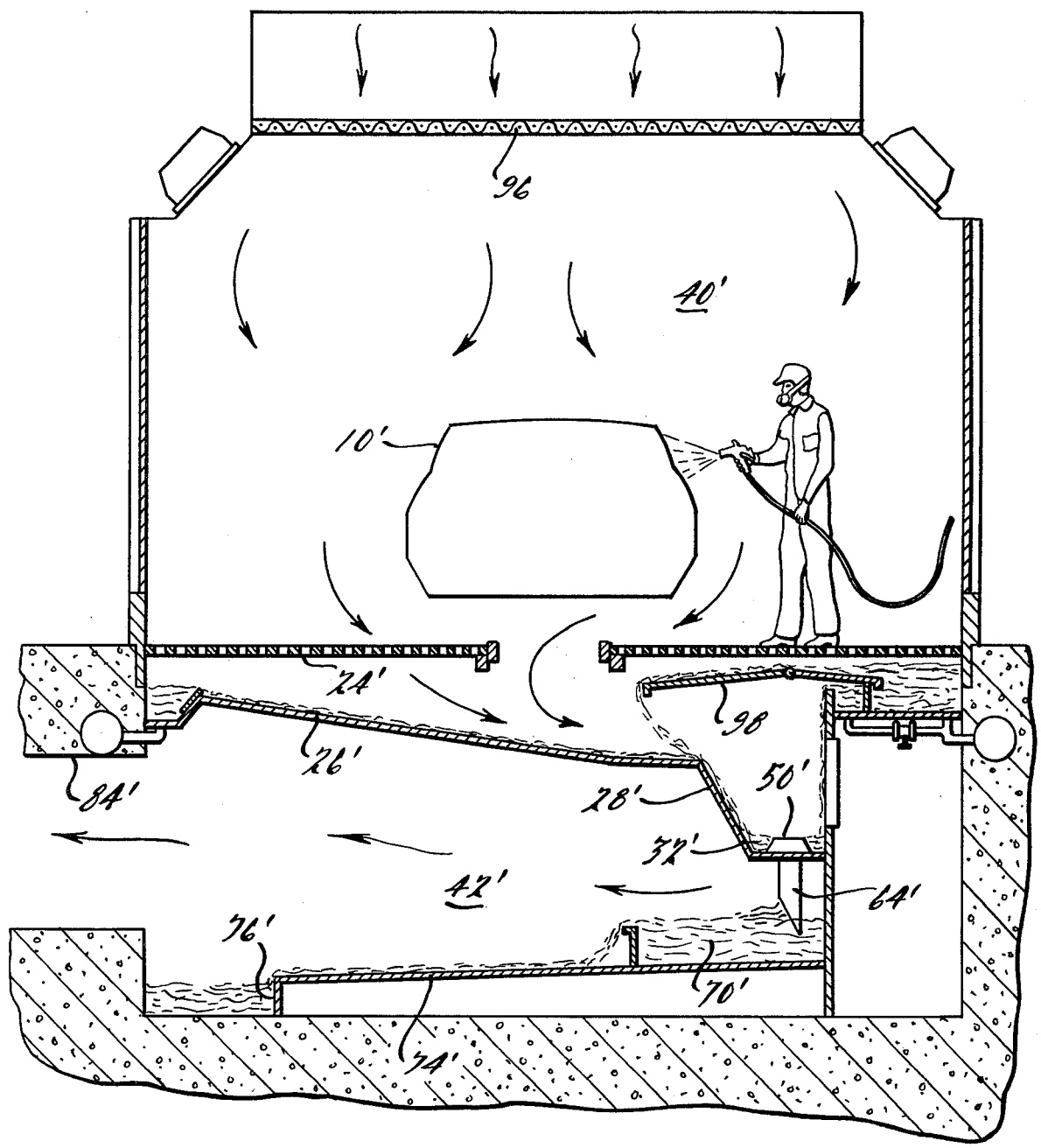
FIG. 7 is a schematic transverse sectional view of an alternative satisfactory embodiment of the present invention.

Referring to FIG. 7 of the drawings, an alternative satisfactory arrangement of scrubbing device is schematically illustrated in which the venturi assemblies are arranged in an offset position from the centerline and the gaseous effluent is withdrawn from only one side of the lower chamber. Like components of the arrangement of FIG. 7 are designated by the same numeral as previously employed with a prime affixed thereto. As shown in FIG. 7 a continuous flow of air passes through a filter 96 defining the roof of the upper spray chamber 40' and passes downwardly over the automobile body 10' being spray painted carrying overspray paint droplets downwardly through the porous grating 24' across a flood sheet section 26' and down an arcuate section 28' into a trough 32'. The base of the trough 32' is provided with a series of venturi assemblies 50' of a construction as previously described through which the liquid and gas stream pass into the lower chamber 42'. A second flood sheet 98 is provided overlying the trough 32' which is similarly flooded with a sheet of liquid washing medium that cascades off the lower inward edge thereof for admixture with the sheet of water flowing downwardly along the flood sheet 26'.

The lower section 42' is formed with a trough 70' which overflows along its inner edge to a drain sheet 74' terminating at its lower end at a sluiceway 76'.

The arrangement as illustrated in FIG. 7 preferably employs a duct 64' connected to the venturi assembly which is angularly biased at its lower edge to facilitate lateral directional guidance of the air stream toward left as viewed in FIG. 7 for discharge through an exhaust duct 84'. In other respects, the structural features and operating characteristics of the arrangement illustrated in FIG. 7 are substantially identical to that as previously described in connection with FIGS. 1 through 6.

It will be apparent from the foregoing, that the replaceable characteristics of the venturi assemblies coupled with the adaptation of the scrubbing device to a modular construction such as containing two venturi assemblies per module as illustrated in FIG. 2 provides for maximum flexibility and versatility in adapting the apparatus to changing conditions and to enable construction of paint spray booth tunnels of any desired length consistent with the desired painting sequence.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A gas scrubbing device comprising a first chamber for receiving a stream of gas containing entrained particulate matter, a second chamber separated from said first chamber by an angularly inclined flood sheet formed with a trough having a base along the lowermost portion thereof, a plurality of frames disposed in said trough defining communicating openings between said first and second chambers, a venturi removably disposed on each frame comprising a pair of downwardly and inwardly inclined side walls and end walls formed at their lower edges with an inwardly extending opposed lip defining therebetween a venturi throat, each said venturi removably supported by each said frame in a substantially horizontal position and with the upper edge thereof spaced upwardly from the base of said trough, means for providing a pressure differential between said first and second chambers to induce flow of gas from said first chamber through said venturi into said second chamber, and means for discharging a continuous sheet of liquid over said flood sheet for flow toward and into said trough and overflow as a continuous curtainous stream into each said venturi for atomization along said lip of said throat by the gas stream passing therethrough.

2. The device as defined in claim 1 further including sealing means for forming a substantially gastight seal between said frame and said venturi.

3. The device as defined in claim 1 in which each said frame is of a rectangular configuration including a pair of upright side members connected to a pair of upright end members, each said venturi formed with a downwardly depending leg extending around the upper edge thereof for overlying the upper edge portion of said side and end members of said frame.

4. The device as defined in claim 1 in which said frames are of an elongated configuration and are disposed in substantially longitudinally aligned spaced relationship along said trough.

5. The device as defined in claim 1 in which the lips of adjacent said venturis are of controlled different sizes to provide respective throats of different cross-sectional areas.

6. The device as defined in claim 1 further including an angularly inclined drain sheet defining the base of said second chamber for receiving the liquid and gas stream entering through said venturis.

7. The device as defined in claim 6 in which said drain sheet is formed with a second trough for accumulating a mass of liquid and disposed in the path of discharge of the liquid and gas stream from said venturis.

8. The device as defined in claim 1 further including a liner removably disposed in form-fitting relationship over the outer surface of said venturi.

9. The device as defined in claim 8 in which said liner is comprised of a thin plastic sheet.

10. The device as defined in claim 9 in which said plastic sheet is comprised of a fluorocarbon polymer.

11. The device as defined in claim 1 in which each said venturi further includes a duct extending downwardly from said throat thereof for guidably directing the atomized liquid and gas stream into said second chamber.

12. The device as defined in claim 11, further including an angularly inclined drain sheet defining the base of said second chamber and formed with a second trough for accumulating a mass of liquid therein, said second trough disposed at a position spaced downwardly from the outlet of each said duct of each said venturi for intercepting and deflecting the liquid and gas stream entering said second chamber through said venturis.

13. The device as defined in claim 12 further including baffles disposed in said second chamber for effecting a serpentine flow pattern of the gas stream to facilitate extraction of liquid droplets from said gas stream.

14. The device as defined in claim 13 further including means for draining the liquid and extracted particulate matter therein from said second chamber.

15. The device as defined in claim 13 further including means for discharging the scrubbed gas stream from said second chamber.

16. The device as defined in claim 13 in which at least one of said baffles is oriented to intercept the deflected liquid and gas stream in a manner to form a downwardly curtainous stream of liquid through which the gas stream is directed effecting a secondary scrubbing thereof.

* * * * *